United States Patent
Lee et al.

(10) Patent No.: US 9,194,932 B2
(45) Date of Patent: Nov. 24, 2015

(54) METHOD AND SYSTEM FOR AIRPLANE CONTAINER TRACKING

(71) Applicant: Petari USA, Inc., Boston, MA (US)

(72) Inventors: Brian Lee, Boston, MA (US); Mrinmoy Chakraborty, Bangalore (IN); Jamshed Dubash, Shrewsbury, MA (US); Jahangir Nakra, Titusville, NJ (US)

(73) Assignee: Senaya, Inc., Boston, MA (US)

( * ) Notice: Subject to any disclaimer, the term of this patent is extended or adjusted under 35 U.S.C. 154(b) by 135 days.

(21) Appl. No.: 13/906,804

(22) Filed: May 31, 2013

(65) Prior Publication Data
US 2013/0321122 A1 Dec. 5, 2013

Related U.S. Application Data

(60) Provisional application No. 61/654,351, filed on Jun. 1, 2012.

(51) Int. Cl.
| | |
|---|---|
| *G08B 1/08* | (2006.01) |
| *G01S 5/00* | (2006.01) |
| *H04W 8/22* | (2009.01) |
| *G06Q 10/08* | (2012.01) |
| *G07C 9/00* | (2006.01) |

(52) U.S. Cl.
CPC ............ *G01S 5/0009* (2013.01); *G01S 5/0018* (2013.01); *G01S 5/0027* (2013.01); *G06Q 10/0833* (2013.01); *H04W 8/22* (2013.01); *G06Q 10/08* (2013.01); *G07C 9/00111* (2013.01)

(58) Field of Classification Search
CPC . B60R 16/0315; B61L 7/088; H04L 12/2803; H02J 13/00; A61M 1/00
USPC .................................. 340/3.1, 539.13, 572.8
See application file for complete search history.

(56) References Cited

U.S. PATENT DOCUMENTS

| | | | | |
|---|---|---|---|---|
| 4,009,393 | A * | 2/1977 | Ashley, Jr. ............ | F41G 7/2213 235/411 |
| 6,281,797 | B1 * | 8/2001 | Forster .................. | G01S 5/0018 340/438 |
| 6,734,796 | B2 | 5/2004 | Forster et al. | |
| 6,975,941 | B1 * | 12/2005 | Lau ........................ | G01C 21/00 340/539.13 |
| 7,072,668 | B2 * | 7/2006 | Chou .................... | G01S 5/0027 342/357.4 |
| 7,501,944 | B2 | 3/2009 | Hyde | |
| 7,791,455 | B1 | 9/2010 | MacLean, III et al. | |

(Continued)

FOREIGN PATENT DOCUMENTS

| | | |
|---|---|---|
| EP | 0984418 A2 | 8/2000 |
| WO | 2008151438 A1 | 12/2008 |

OTHER PUBLICATIONS

U.S. Appl. No. 13/906,80, Lee et al.*

*Primary Examiner* — Jennifer Mehmood
*Assistant Examiner* — Rufus Point
(74) *Attorney, Agent, or Firm* — HolzerIPLaw, PC (57) ABSTRACT

Wireless tracking systems and devices to detect the status of aircraft cargo containers. The system uses a sensor array to deactivate and activate the tracking devices as needed to comply with FAA regulations. The tracking systems use an array of machine vision sensors and/or inertia (motion) sensors to determine when to activate and deactivate the device. The tracking systems can feature LTE communication devices with a global roaming SIM card to realize true global operation to support GSM, CDMA and other mobile environments seamlessly.

18 Claims, 5 Drawing Sheets

(56) References Cited

U.S. PATENT DOCUMENTS

| | | | |
|---|---|---|---|
| 8,239,169 B2 | 8/2012 | Gregory et al. | |
| 8,299,920 B2 | 10/2012 | Hamm et al. | |
| 8,392,339 B2 | 3/2013 | Kraft | |
| 2004/0100379 A1* | 5/2004 | Boman | G06Q 10/047 340/539.26 |
| 2004/0196182 A1* | 10/2004 | Unnold | G01S 5/0027 342/357.25 |
| 2005/0099500 A1* | 5/2005 | Fujita | H04N 5/23206 348/207.99 |
| 2006/0055552 A1* | 3/2006 | Chung | B60R 25/00 340/686.1 |
| 2006/0109106 A1* | 5/2006 | Braun | G06Q 10/08 340/539.13 |
| 2006/0152357 A1* | 7/2006 | Hyde | G01S 5/0027 340/539.13 |
| 2006/0202809 A1* | 9/2006 | Lane | G06Q 10/08 340/438 |
| 2006/0238347 A1* | 10/2006 | Parkinson | G08B 13/1436 340/572.4 |
| 2008/0030345 A1* | 2/2008 | Austin | A61B 19/44 340/572.8 |
| 2009/0061897 A1 | 3/2009 | Hamilton et al. | |
| 2011/0143811 A1* | 6/2011 | Rodriguez | G06K 9/00986 455/556.1 |
| 2013/0321122 A1* | 12/2013 | Lee | G01S 5/0009 340/3.1 |

* cited by examiner

METHOD AND SYSTEM FOR AIRPLANE CONTAINER TRACKING

CROSS-REFERENCE TO RELATED APPLICATION

This application claims the benefit of U.S. Provisional Application No. 61/654,351 filed Jun. 1, 2012, the entire contents of which are incorporated herein by reference for all purposes.

FIELD OF THE DISCLOSURE

The present disclosure relates generally to wireless asset tracking devices and systems. More particularly, the disclosure relates to wireless asset tracking devices and systems for use with aircraft and/or at airports.

BACKGROUND

In industry nowadays, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries. A wireless tracking device or system is highly beneficial for solving the dilemma of knowing the physical location of the asset at a set point in time.

Federal Aviation Regulation (FAR) Sec. 91.21 restricts the use and operation of wireless communication circuitries and other portable electronic device (PED) aboard aircraft unless it has been previously determined that the specific PED will not cause interference with the navigation and communication system of the aircraft. This covers many RF generating PED, including those that transmit RF (T-PED). However, the FAA restricts the use of cellular wireless communication during taxiing and take off of the aircraft, and while airborne.

Therefore, it is a key technical challenge to devise a tracking device with automatic on-off capability during transit.

SUMMARY

This disclosure is directed to wireless tracking systems and devices to detect the status of aircraft containers. The system uses a sensor technology to deactivate the tracking or transmitter devices before aircraft take off and reactivate the devices after landing yet before taxiing, to comply with FAA regulations. The tracking systems use an array of machine vision sensors and/or inertia (motion) sensors to determine when to activate and deactivate the device. The tracking systems also eliminate the need for explosive and bulky lithium-based batteries from the tracking or transmitter devices, thus enhancing the safety and operational easiness. In some embodiments the tracking systems also feature LTE communication devices with a global roaming SIM card to realize true global operation to support GSM, CDMA and other mobile environments seamlessly.

The disclosure provides tracking devices comprising an array of sensors, including a machine vision sensor with a high dynamic range (HDR>120 dB), a high frame rate, a global shutter, and low cost image sensor. The high frame rate may be at least 100 frame per second, in some embodiments at least 120 or even 140 frames per second. The vision sensor may have a UV protected lens with IR (Infra-Red) sensing capability, an auto-focus feature and/or an anti-shaking frame. The array of sensors includes at least one motion sensor, the motion sensor(s) providing three degrees of freedom, six degrees of freedom, nine degrees of freedom, or ten degrees of freedom. The array of sensors detects the presence of movement and also qualifies the type of movement, for example, take-off, taxiing, landing, etc.

In one particular embodiment, this disclosure provides a wireless tracking system that includes a transmitter device comprising a battery, a GPS positioning element, a RF communication module, a cellular communication module, memory, and a sensor array, the RF communication module and the cellular communication module each configured to deactivate and activate based on movement detected by the sensor array. The system also includes a receiver. The transmitter is configured to send data regarding the location of the transmitter to the receiver, and the receiver is configured to receive the data from the transmitter.

In another particular embodiment, this disclosure provides a wireless tracking device comprising a battery, a GPS positioning element, a RF communication module, a cellular communication module, memory, and a sensor array comprising a machine vision sensor with a high dynamic range (HDR>120 dB), a high frame rate (FRS>100), a global shutter, and low cost image sensor.

In another particular embodiment, this disclosure provides a method of tracking a container in an aircraft. The method includes operably attaching a tracking device to the container, the tracking device configured with an RF module and a cellular module. If the container is outside of the aircraft, the device transmits the container's location via an RF signal. As the container passes through a door into an aircraft cargo hold, the device transmits the container's location via a cellular signal. When the container is in the cargo hold, the RF module and the cellular module deactivate. The RF module and cellular module remain deactivated when the aircraft is at cruise altitude. After landing, as the container passes through the door out from the aircraft cargo hold, the device transmits the container's location via a cellular signal. When the unloaded container is outside of the aircraft, the devices transmits the container's location via an RF signal.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DISCUSSION OF THE INVENTION

A wireless tracking system is highly beneficial in knowing the physical location of an asset at a set point in time. This is particularly beneficial for aircraft cargo. However, tracking systems designed for use with aircraft cargo must be specially designed to comply with FAA requirements. Prior art tracking systems often generate many false negatives and false positives due to variation of aircraft engine operation and environment. These known tracking systems are also limited with GSM or CDMA communication, thus true seamless global operation is not realized by these systems. There has been ever increasing demand to devise a tracking device and tracking system for airplane containers to provide total visibility without human intervention.

The present invention provides fault-free on-off operation to comply with FAA regulations, provides seamless global operation without chaining devices or adding additional mobile devices, and uses simple business logic to minimize or eliminate false negatives. The systems include an array of machine vision sensor(s) and/or inertia (motion) sensor(s) to detect movement of the cargo and deactivate the tracking devices before aircraft take off and reactivate the devices after landing yet before taxiing. In some embodiments, the sensor array has a vision sensor only or a motion sensor(s) only. The sensor array (e.g., combination of the machine vision sensor(s) and the motion sensor(s)) detects the location of the cargo (e.g., within the cargo hold) and the status of the aircraft (e.g., idle, take-off mode, taxiing, landing-mode, etc.). The systems and devices of this invention can be operated on a global basis regardless of cellular infrastructure since most airplanes fly across and throughout countries where basic cellular infrastructure may vary from CDMA to GSM, from 2G to 4G LTE. In some embodiments of the systems, no battery is required in the tracking devices, thus virtually eliminating the need for external battery charging or replacement.

In this discussion, a "tracking device," "transmitter device," and variations thereof is a portable, signal emitting device configured for placement in or on an asset to be tracked, such as a container of goods. A "tracking system" and variations thereof includes at least one tracking or transmitter device, and a receiver for receiving the location signal from the tracking transmitter device(s).

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As will be appreciated by one of skill in the art, the invention of the present disclosure may be embodied as a method, system, computer program product, or a combination thereof. Accordingly, the invention of the present disclosure may take the form of an entirely hardware embodiment, an entirely software embodiment (including firmware, resident software, micro-code, etc.) or an embodiment combining software and hardware aspects that may generally be referred to herein as a "system."

Figure 1:
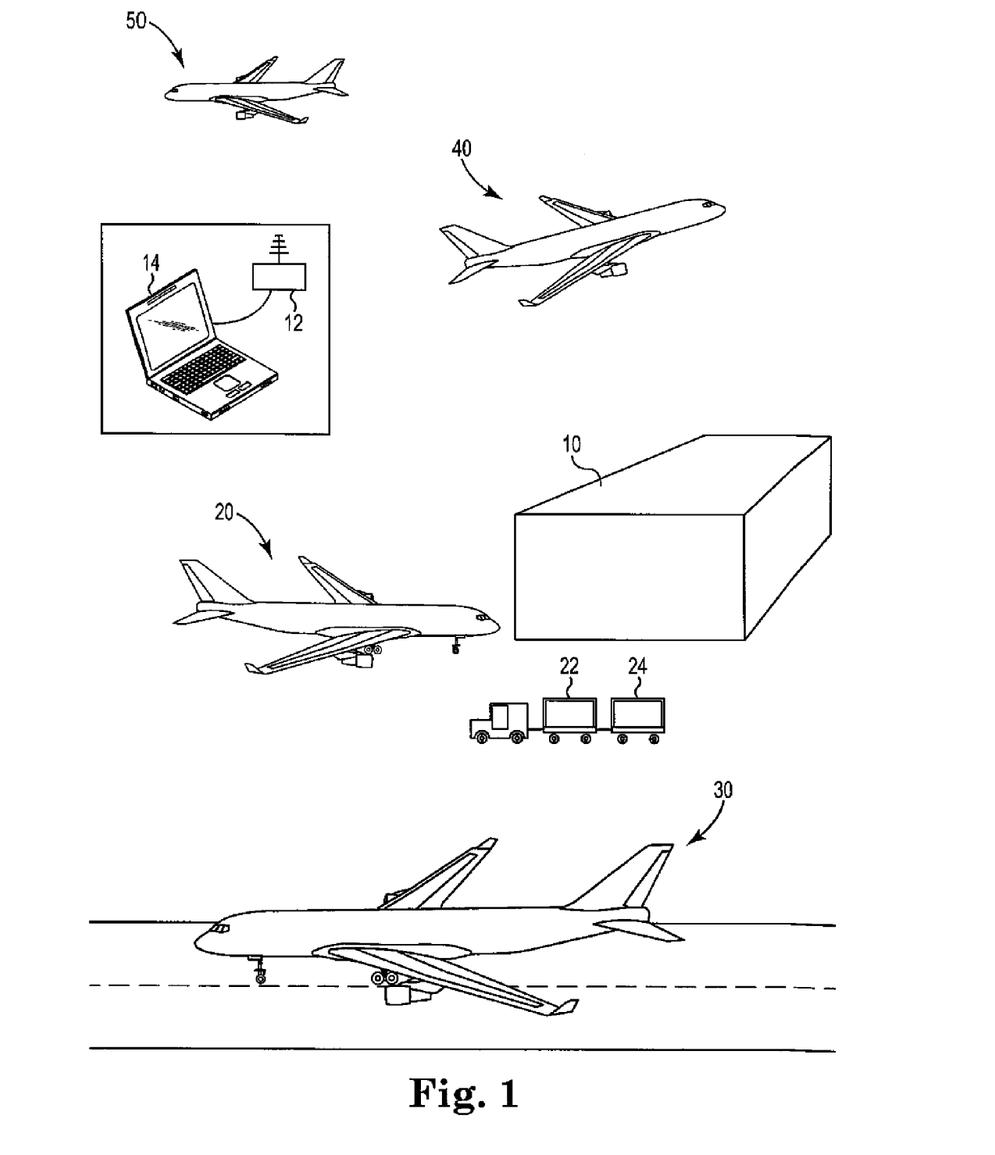
FIG. 1 is a schematic diagram of an airport environment, illustrating aircraft in various modes.

FIG. 1 schematically illustrates an airport environment, showing aircraft in different stages or modes of operation. The tracking systems and devices of this disclosure are particularly configured to operate in an airport environment, comply with FAA regulations, operate globally with enhanced safety features, and facilitate operation.

In FIG. 1, a cargo terminal 10 is illustrated with an aircraft 20 parked in close proximity thereto; aircraft 20 is in the process of being loaded with cargo containers 22, 24 that have attached thereto transmitter devices in accordance with this disclosure. Located in a remote location, for example within terminal 10 or in an office building remote from the airport, is a receiver 12 operably connected to a display screen or monitor 14 (e.g., a computer). Receiver 12 is operably connected to a network, as will be described below. The tracking system, which includes receiver 12 and at least one tracking or transmitter device, uses an established wireless communication network (not illustrated) to identify the location of the transmitter device and convey that information to display 14.

The transmitter device is secured to container 22, 24. In some embodiments, the transmitter device may be secured to the container, be in the container, or be secured to a pallet on which the container is positioned, in other embodiments the transmitter device is embedded or otherwise permanently affixed to the container or pallet, whereas in other embodiments the transmitter device is removably secured to the container or pallet. The device is preferably positioned so that no operators, equipment, adjacent containers, etc. can access the transmitter device during normal movement of the device and remove, damage or otherwise hinder the operation of the device.

FIG. 1 also illustrates an aircraft 30 in a taxiing mode, an aircraft 40 in a take-off mode, and aircraft 50 at cruise altitude. Each of these aircraft 30, 40, 50 includes containers tagged with a transmitter device according to this disclosure. The system of this disclosure deactivates and reactivates the transmitter devices, and switches between various communication networks, depending on the status of the aircraft, in compliance with FAA regulations and other regulatory requirements. For example, RF communications are not allowed, at least, during take-off and landing and at cruise altitude, and cellular communications are not allowed during taxiing, take-off, and cruise altitude.

Aircraft, in general, have dynamic and frequent changes in their route and business environment and the tracking system of this disclosure is configured to function throughout the aircraft's route. The tracking system can utilize established position locating technology, such as Global Positioning System (GPS), any global navigation satellite system (GNSS) such as GLONASS or Galileo, or a compass navigation system.

The tracking system relies on established, technically mature, wireless communication networks such as CDMA/GMS, ZigBee, (Low Energy) BlueTooth (LBT), WiFi (sometimes referred to as WLAN), LTE, and WiMax, and also CDMA (Code Divisional Multiple Access) and/or GSM (Global System for Mobile Communication) to relay the position of the asset being tracked to the system. By utilizing globally available communication networks, the need for infrastructure such as Wi-Fi routers and relays in each airport is avoided.

Aircraft do not include an automatic detection system that is capable of detecting when an electronic device having a field-emitting device is being used on the aircraft. Airlines must rely on a flight attendant's visual inspection to ensure that passengers are not using electronic devices in an improper manner. Therefore, there exists a possibility that a passenger may use a field-emitting electronic device while on-board an aircraft that goes undetected by the flight attendants and that may cause interference with the aircraft systems in an unsafe manner. Electronic devices may also cause undesired interference with other types of transportation vessels, in addition to aircraft, if such electronic devices are not deactivated or disabled.

It has been determined that for a deactivation method, it is inadequate to rely on a manual switch off of the tracking device when it enters the aircraft. For instance, human operators may forget to deactivate the tracking device when the container is entered into the transportation vessel. Additionally, these containers are normally tightly packed into the transportation vessel cargo hold in such a manner that they are not easily accessible once the cargo hold has been completely loaded. One container with a tracking device still activated may require that the entire transportation vessel be unloaded in order to access and deactivate the tracking device. Further, once the container is removed from the transportation vessel at the end of its journey, the tracking device must be reactivated so the container can again be adequately tracked.

Because the FAA restricts the use of RF wireless communication and cellular wireless communication during various stages of aircraft operation, to avoid potential interference with the navigation and communication systems of the aircraft, the tracking devices have an automatic on-off capability, that allows deactivation of the device without requiring human intervention. An array of sensors (motion sensor(s) and machine visual sensor(s)) triggers deactivation of the device when required, eliminating the need for human intervention.

The device also reduces the maintenance requirement of the transmitter device, which commonly required frequent and regular battery replacement or recharging by trained service crews, by being independently powered and automatically rechargeable.

Figure 2:
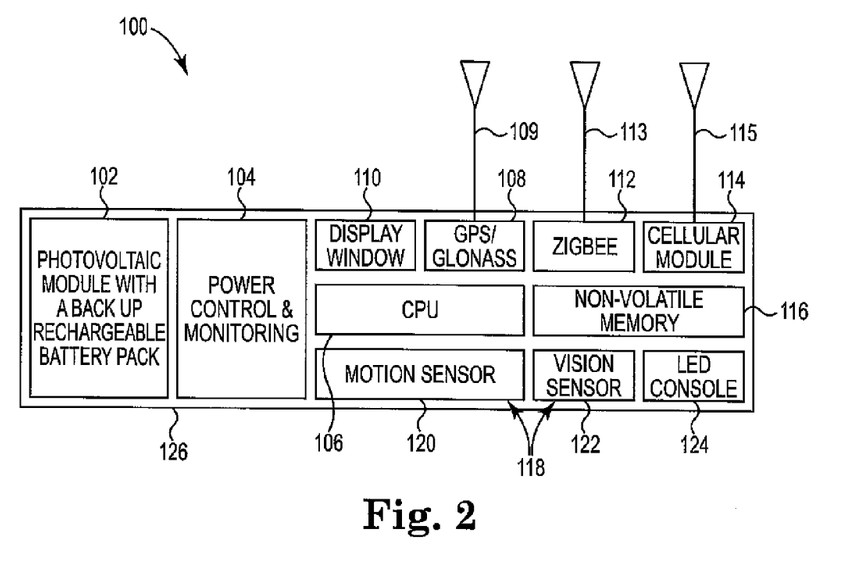
FIG. 2 is a schematic block diagram of a tracking device according to this disclosure.

FIG. 2 illustrates an embodiment of a tracking or transmitter device 100 according to this disclosure; at least one device 100, together with receiver 12, forms a tracking system. Device 100 includes a power source 102, which may be a single use battery or a rechargeable battery. Examples of suitable batteries include NiCad, lithium, lithium-ion, zinc-carbon, and alkaline batteries. For example, a 3.7V battery could be used, although it is understood that other voltage batteries could be used. In FIG. 2, power source 102 includes a rechargeable battery pack and a photovoltaic module to recharge the battery pack when needed. Other power source rechargers or regenerators could be utilized, including inductive coil, a USB power-line, and mechanical energy harvesting mechanisms.

Electrically connected to power source 102 is a power module 104 that includes a battery level monitor and a power control, which in turn is operably connected to a computer chip or CPU 106. Together CPU 106 and power module 104 activate and deactivate various elements of device 100, based on the status of the aircraft in which device 100 is located. Transmitter device 100 also includes a positioning element, in this embodiment a GPS/GLONASS positioning element 108 connected to an antenna 109, which may be an internal antenna or an external antenna. Positioning element 108 provides data to transmitter device 100 regarding its physical location.

Transmitter device 100 transmits information or data, such as its location, in the form of a "ping" to display 14 via a wireless network; the information or data may also be provided to a display 110 on device 100. In some embodiments, transmitter device 100 has two-way communication with receiver 12. That is, transmitter device 100 transmits information (i.e., a ping) and also receives information from receiver 12. Further, transmitter device 100 may receive instructions, such as to acknowledge that device 100 is active and ready and to transmit the location information. Having received those instructions, device 100 can send back to receiver 12 acknowledgement that the communication was received and acted on.

As indicated, the transmitter device is configured to send and optionally receive data via a wireless network. Device 100 of FIG. 2 is configured with a ZigBee module 112 to connect to receiver 12 via a ZigBee network and communicate data to display 14. An alternate embodiment of a transmitter device can utilize a ZigBee/LBT module and a corresponding ZigBee/LBT network. Additionally, transmitter device 100 may include a data receiver (not shown), such as an infra red data link (IrDA), to provide a second communication means to device 100, as an alternate or back-up to module 112. An IRDA includes an optical window formed from an IR transparent material, such as glass, to allow infra red radiation or energy to pass to and from the IrDA.

Device 100 also includes a cellular communication module 114, which may be CDMA (Code Divisional Multiple Access) and/or GSM (Global System for Mobile Communication) module, configured to connect to receiver 12 via either a CDMA or GSM network and communicate data to display 14. Modules 112, 114, respectively, have an antenna 113, 115 which may optionally include a power amplifier to extend the range of the signal from modules 112, 114. In some embodiments, modules 112, 114 may be combined into a single physical module rather than two separate or distinct modules.

Together, modules 112, 114 provide the communication basis for transmitter device 100 to receiver 12 and display 14. Module 112, which connects device 100 a wireless RF network, is utilized when FAA regulations allow use of RF communications, and module 114, which connects device 100 to a cellular network, is utilized when FAA regulations do not allow the use of RF communications yet do allow cellular communications. Additional details regarding when which wireless network is utilized are provided below.

Any of the data or information regarding device 100, such as its position as determined by positioning element 108, alarm information, battery level information, etc., can be stored in a memory 116 of device 100, which may be a permanent memory or a rewritable memory. Data from memory 116 may be transmitted to receiver 12 or may be retained in memory 116 until manually retrieved.

Tracking device 100 includes a sensor array 118 to determine the location of device 100 in relation to an aircraft and to determine the status or mode of the aircraft, in order to determine when to activate and deactivate the device. Sensor array 118 includes at least one motion sensor 120 and a machine vision sensor 122.

Figure 3A:
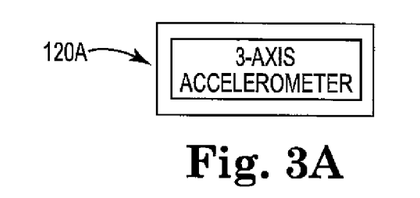
FIGS. 3A, 3B, 3C and 3D are schematic block diagrams of motion sensors suitable for use in the tracking devices according to this disclosure.
Figure 3B:
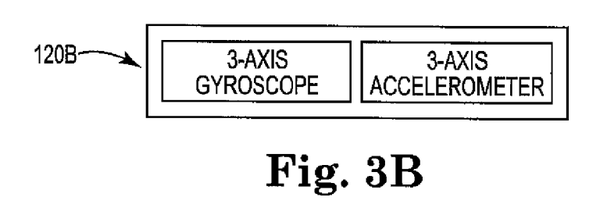
Figure 3C:
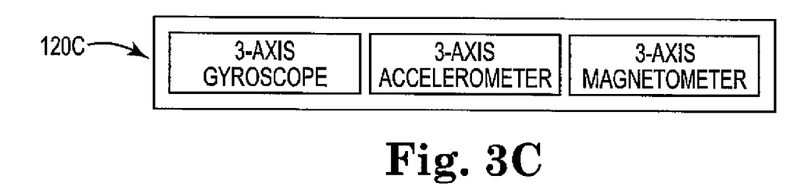
Figure 3D:
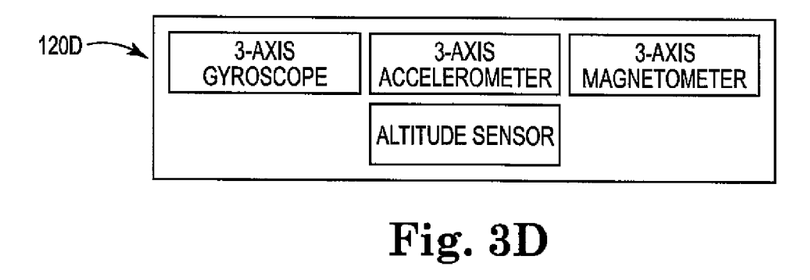

FIGS. 3A through 3D illustrate four embodiments of suitable motion sensors 120 for device 100. In FIG. 3A, motion sensor 120A is a three degree of freedom (DOF) device that has a 3-axis accelerometer. In FIG. 3B, motion sensor 120B is a six degree of freedom (DOF) device that includes a 3-axis gyroscope and a 3-axis accelerometer. In FIG. 3C, motion sensor 120C is a 9-DOF device that includes a 3-axis gyroscope, a 3-axis accelerometer and a 3-axis magnetometer. In FIG. 3D, motion sensor 120D includes a 3-axis gyroscope, 3-axis accelerometer, 3-axis magnetometer, and also an altitude sensor; this may be referred to as a 10-DOF device. Other embodiments of motion sensor 120 may be used. With the various multiple degrees of freedom, device 100 can distinguish among various movements, orientations and locations, such as lateral motion, acceleration, inclined or declined motion, and altitude. With this information, device 100 can determine the aircraft's status, e.g., idle, taxiing, take-off, cruising at altitude, landing, etc.

Machine vision sensor 122 applies image processing to images captured by an integral camera and calculates the characteristics of an object, such as its area, center of gravity, length, or position, and outputs the data or judgment results. Examples of the objects vision sensor 122 can detect, when incorporated into tracking device 100, include an aircraft door, movement of a conveyer belt, sunlight entering through the aircraft door, and curvature of the cargo hold. Vision sensor 122 is selected to have a high dynamic range (HDR>120 dB), high frame rate (at least FRS>100 frame per second, in some embodiments FRS>120 or even >140), a global shutter (to minimize smearing and distortion of images), and preferably, a low cost CMOS Image Sensor to capture the entrance and exiting event of a container from an airplane door. Vision sensor 122 can be configured with UV protected lenses with IR (Infra-Red) sensing capability for night vision detection. This sensor may also work as a light sensor to detect indoor light. Vision sensor 122 may be equipped with an auto-focus and anti-shaking frame. A normally closed mechanical on/off shutter may be included to avoid direct exposure of sensor 122 to sunlight when not in use, such as during a sleep mode.

Unlike motion sensor 120, which is active at all times during the operational time, vision sensor 122 is usually in a default sleep mode to save power. Vision sensor 122 is woken up (or activated) by a signal from motion sensor 120 when a movement above a threshold level is detected by motion sensor 120. The motion threshold may be set either as a part of a SMART Ping™ (e.g., see for example, patent application Ser. Nos. 13/796,574 and 13/796,683, both filed Mar. 12, 2013 and assigned to Petari USA, Inc., which are incorporated herein by reference) or as a predetermined pattern of movement. One exemplary pattern is a set combination of lateral motion followed by a vertical (or sliding up) motion, which is indicative of loading into a cargo hold. Using a motion threshold, rather than merely motion, will minimize the occurrence of false positives obtained from motion sensor 120. Once in the cargo hold, machine vision sensor 122 can confirm whether or not device 100 is in fact in the cargo hold, by evaluating, for example, the cargo hold curvature, the shape of the door, or sunlight entering through the door to the hold.

Figure 5:
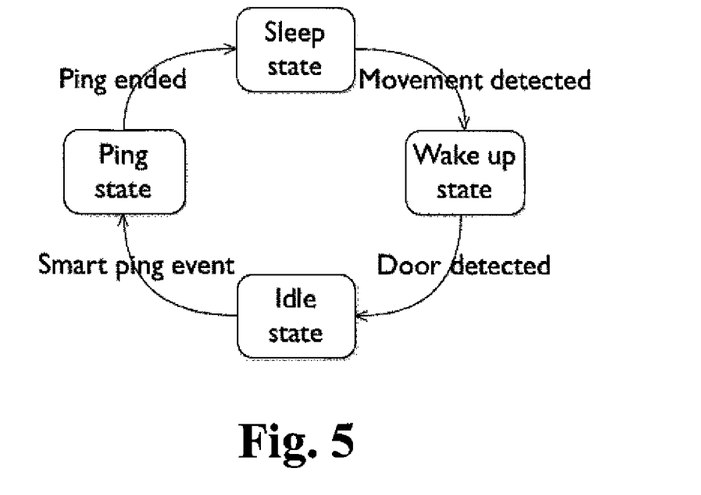
FIG. 5 is block diagram of an example tracking system utilizing loading events for activation of the tracking device.

FIG. 5 shows an example of state diagram for a SMART Ping™ system that utilizes loading events as a threshold. Initially, the tracking or transmitter device is in sleep state. The device will go to wake-up state when movement is detected. If the machine vision sensor detects a door of the aircraft, it goes to idle state. Here after, the device will check if a preset timer has expired. When the timer has expired, the device will go to a ping state, where the device send a ping to a remote host. When a wireless transmitter (e.g., CDMA or ZigBee or WiFi) is unavailable, the data message will be saved in an internal memory of the device for later use. Hereafter, the device will go to sleep mode.

Figure 6:
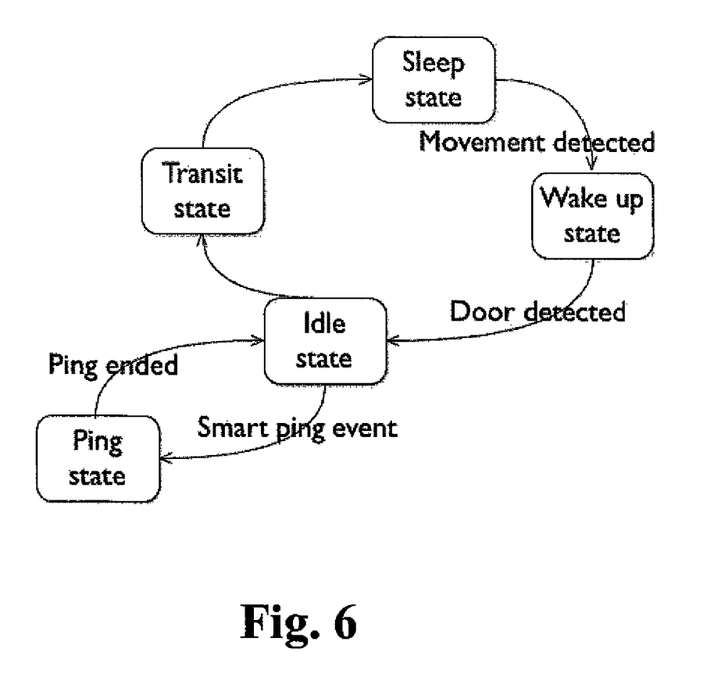
FIG. 6 is block diagram of an example tracking system utilizing unloading events for activation of the tracking device.

FIG. 6 shows an example of state diagram for a SMART Ping™ system that utilizes unloading events as a threshold. Initially, the tracking or transmitter device is in sleep state. The device will go to wake-up state when movement is detected. If the machine vision sensor detects a door of the aircraft indicating the container leaving the aircraft, it goes to idle state. Here after, the device will check if a preset timer is expired. When the timer has expired, the device will go to a ping state in which the device sends a ping to a remote host. When a wireless transmitter (e.g., CDMA or ZigBee or WiFi) is unavailable, the data message will be saved in an internal memory of the device for later use. When motion sensors of the device observe a predetermined number and sequence of movements within a preset time, the device will go into a transit state. Once the device is in the transit state, it goes immediately into sleep mode without enabling the motion sensors in order to preserve the battery. The device will wake up at predetermined intervals and enable the sensor to check if the transit is finished. The device goes to the sleep state when no activity is observed.

Returning to FIG. 2, device 100 may also include an indicator console 124 having various operational switches, gauges, buttons, and/or lights (e.g., LED lights). Console 124 may include any number of optional features, such as an audio alarm to indicate any number of problems or malfunctions, such as low battery level, unauthorized movement (as sensed by motion sensor 120), or tampering with device 100. Device 100 may include a temperature gauge.

The various elements that compose transmitter device 100 may be housed in an RF and/or cellular transmissive case 126, preferably one that is at least water resistant. Case 126 may be, or may include, a protective window transparent to visible and IR light.

Returning to FIG. 1, the tracking system is configured to deactivate transmitter device 100 when the aircraft on which the device 100 is located is in a certain stage or mode. Aircraft 20 is in a loading stage, aircraft 30 in a taxiing mode, an aircraft 40 in a take-off mode, and aircraft 50 at cruise altitude. Current FAA regulations restrict the use and operation of wireless communication circuitries, both RF and cellular, from various stages of aircraft movement. For example, the FAA restricts the use of cellular wireless communication during take off and before taxiing, during take-off, and when at cruise altitude. The FAA also restricts the use of RF devices during take-off, landing, and taxiing.

Due to sensor array 118, which includes at least one motion sensor 120 and machine vision sensor 122, device 100 can distinguish the aircraft's status, e.g., idle, taxiing, take-off, cruising at altitude, landing, etc. and deactivate or activate either or both communication modules 112, 114 as needed. Device 100 can be initially programmed with current FAA regulations directed to RF and cellular communication, or can be configured to be manually programmed. It may be desired to have sufficient manual access to CPU 106 of device 100 to alter the deactivation and activation of modules 112, 114 based on new FAA regulations or when flying in regions of the world that might have different regulations.

Figure 4:
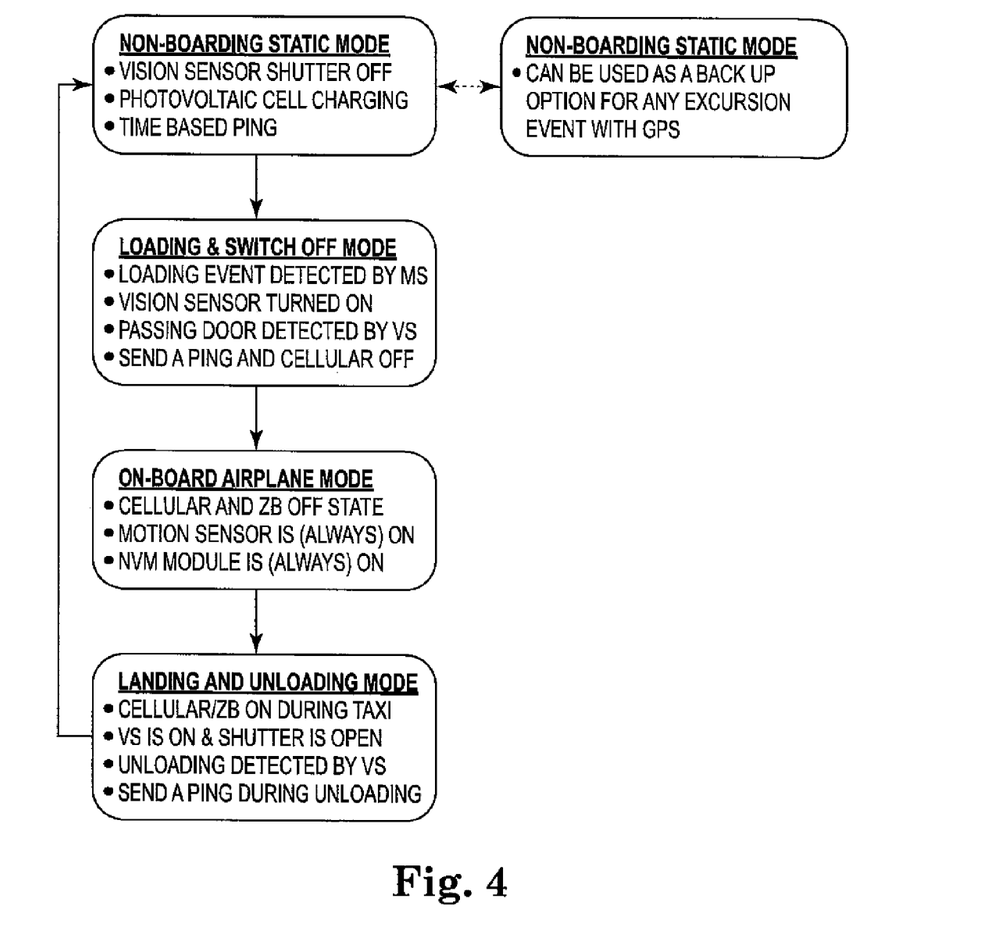
FIG. 4 is a block diagram flowchart of various aircraft modes and possible actions of the tracking system and tracking device during those modes.

FIG. 4 illustrates various aircraft modes and an example of possible actions/states of the tracking system and tracking device 100 during those modes. As seen in FIG. 4, during a non-loading or non-boarding static mode, vision sensor 112 is off, conserving power. If device 100 is outside or has access to UV light, the photovoltaic cell of power module 102 can be recharging the battery. At this stage, when no movement is detected, device 100 may send time-based pings to receiver 12 indicating its location and/or status; these pings may be sent via RF module 112 or cellular module 114. Upon initiation of loading of the tagged cargo, motion sensor 120 will detect the movement and activate vision sensor 122. In this exemplified embodiment, vision sensor 122 confirms passing through the cargo door, after which device 100 sends a ping to receiver 12 and then turns off cellular module 114. Once in the cargo hold on board the aircraft, both RF module 112 and cellular module 114 deactivate. Motion sensor 120 and memory 116 remain on throughout the taxiing, take-off and cruising modes of the aircraft. When motion sensor 120 determines that the aircraft has landed, both RF module 112 and cellular module 114 reactivate, as does vision sensor 122. Vision sensor 122 detects unloading of the cargo through the cargo hold door. With the cargo removed from the hold, device 100 sends a ping to receiver 12, indicating its arrival, via RF module 112 or cellular module 114.

Any suitable computer usable or computer readable medium may be utilized for device 100 to deactivate and activate modules 112, 114 and vision sensor 112. In the context of this disclosure, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Another example of various aircraft modes/activities and possible actions/states of the tracking system and tracking device 100 follows. During a 'loading and switch "off" mode', the cargo container is moved (e.g., laterally and lifted up), thus activating vision sensor 122. Passing through the cargo hold door is detected by vision sensor 122. Device 100 then sends a status report (e.g., location, time, etc.) to receiver 12 via cellular module 114. Motion sensor 120 (e.g., an altitude sensor) detects a set altitude or height and that the container is stationary. The door is closed, stray light entering through the door is stopped and optionally a light within the cargo hold is turn on, thus deactivating device 100 (in some embodiments except for motion sensor 120 and memory 116). During a 'landing and switch "on" mode', when motion sensor 120 detects altitude changes and deceleration, RF module 112 and other features expect cellular module 114 activate. By the angle and sudden deceleration, landing of the aircraft is detected, after which cellular module 114 activates. After the aircraft has fully stopped, vision sensor 122 activates and detects (by light sensor) when the cargo hold door is opened. Motion sensor 120 detects when the container is moved and lifted down. At this time, a status report (e.g., location, time, etc.) is sent to receiver 12 via cellular module 114, indicating that the cargo has arrived. If the cargo is in a static (e.g., unmoving) mode for more than a predetermined amount of time, device 100 deactivates, switching to a sleep mode, including deactivating vision sensor 122 and memory 116. Device 100 may activate and send time-based pings to receiver 12 at set ping intervals.

It is understood that numerous variations of a tracking system and/or tracking device have been discussed above and could be made while maintaining the overall inventive design of that disclosed above and remaining within the scope of the invention. Numerous alternate design or element features have been mentioned. One skilled in the art will appreciate that the present invention can be practiced with embodiments other than those disclosed. The disclosed embodiments are presented for purposes of illustration and not limitation.

Additional disclosed embodiments include:
1. Tracking devices and their operating method.
2. Tracking devices with a photovoltaic power source with a back up battery pack which can be charged by an inductive coil, a USB power-line, or another energy harvesting device.
3. Tracking devices having a vision sensor with HDR, high FPS, Global shutter, auto-focusing, anti-shaking, mechanical shutter, UV protection lens, CMOS Image Sensor, VGA resolution video sensor, image processing, and any variations of alike.
4. Tracking devices with LTE global SIM card for seamless global operation (e.g., with 700 MHz-800 Mz antenna arrangement), CDMA/GSM global roaming feature with dedicated antenna feature, or GSM only based global roaming features.
5. Tracking devices with RF communication module (e.g., ZigBee module) for terminal level location identification and real time airport level inventory control capability.
6. Tracking devices with a display window to display operational commands and information such as item level identification, transaction information, transportation information, etc. These could be replaced by passive RFID tag or ZigBee with hand-held reader module, the display module may be moved to a hand-held device, or replaced with LED lights with a preprogrammed code.
7. Tracking devices having a protective window transparent to visible and IR light while strong enough to support the device as a whole with supporting structure between the protective window and bottom layer.
8. Tracking devices with loading and unloading event detection determined by a sensor array that includes motion detection (for example, by 10-axis accelerometer) and a vision sensor with image processing technique, by a vision sensor only, by a motion sensor only, as a tandem mode of operation, or as a back up option to each other.
9. Tracking devices having an operational sequence where the tracking device can turned on and off based on a predetermined event determined by using sensory information.
10. While at altitude, the sensor(s) and memory modules are operational to collect in-transit activities such as temperature, motion, and light information. This information is stored in the memory module and can be reported immediately or after landing.
11. Tracking devices having a combination of a vision sensor and motion sensor(s) to detect business critical events and control or augment a device or a system.

Thus, embodiments of the METHOD AND SYSTEM FOR AIRPLANE CONTAINER TRACKING are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:
1. A wireless tracking system for use with aircraft, comprising:
a transmitter device comprising a battery, a GPS positioning element, an RF transmitter module, a cellular transmitter module, memory, and a sensor array including a motion sensor and a vision sensor, the RF transmitter module configured to deactivate when loaded into the aircraft, when loading is detected by the motion sensor, and reactivate when the aircraft has landed, as detected by the motion sensor, and the cellular transmitter module configured to deactivate when passed through a cargo door of the aircraft, as detected by the vision sensor, and reactivate when the aircraft has landed, as detected by the motion sensor; and a receiver;

the cellular transmitter module configured to send data regarding the location of the transmitter device to the receiver when the transmitter device is outside of the aircraft and the RF transmitter module configured to send data regarding the location of the transmitter device to the receiver when the aircraft is not at altitude, and the receiver configured to receive the data from the transmitter modules.

2. The tracking system of claim 1 wherein the RF transmitter module is a ZigBee, LBT, and/or Low Energy Blue-Tooth transmitter module.

3. The tracking system of claim 1 wherein the cellular transmitter module is a CDMA and/or GSM transmitter module.

4. The tracking system of claim 1 wherein the battery is a rechargeable battery.

5. The tracking system of claim 4 further comprising a battery recharging mechanism.

6. The tracking system of claim 1 wherein the vision sensor comprises a machine vision sensor with a high dynamic range (HDR>120 dB), a high frame rate, a global shutter, and low cost image sensor.

7. The tracking system of claim 6 further comprising a motion sensor having ten degrees of freedom.

8. The tracking system of claim 6 wherein the high frame rate is at least 100 frames per second.

9. The tracking system of claim 6 wherein the vision sensor has a UV protected lens with IR (Infra-Red) sensing capability.

10. The tracking system of claim 6 wherein the vision sensor has an auto-focus and anti-shaking frame.

11. A tracking device comprising a battery, a GPS positioning element, an RF transmitter module, a cellular transmitter module, a sensor array comprising motion sensor and a machine vision sensor, memory that saves location data, programming to deactivate the RF transmitter module when loaded into an aircraft, as detected by the sensor array, and reactivate the RF transmitter module when the aircraft has landed, as detected by the motion sensor, and to deactivate the cellular transmitter module when passed through a door of the aircraft, as detected by the vision sensor, and reactivate the cellular transmitter module when the aircraft has landed, as detected by the motion sensor, the sensor array comprising a machine vision sensor with a high dynamic range (HDR>120 dB), a high frame rate (FRS>100), a global shutter, and low cost image sensor, with the memory and the sensor array configured to remain activated when on-board the aircraft.

12. The tracking device of claim 11 wherein the vision sensor further has a UV protected lens with IR (Infra-Red) sensing capability.

13. The tracking device of claim 11 wherein the vision sensor further has an auto-focus and anti-shaking frame.

14. The tracking device of claim 11 wherein the sensor array further comprises a motion sensor having ten degrees of freedom.

15. The tracking device of claim 11 further comprising a global tracking SIM card.

16. The tracking device of claim 11 devoid of an RF receiver module and devoid of a cellular receiver module.

17. The tracking device of claim 11 wherein the RF transmitter module and the cellular transmitter module are two separate modules.

18. The tracking system of claim 1 wherein the RF transmitter module and the cellular transmitter module are two separate modules.

* * * * *